(12) United States Patent
Nahapetian et al.

(10) Patent No.: US 7,106,486 B1
(45) Date of Patent: Sep. 12, 2006

(54) OPTICAL MODULATOR CONTROL SYSTEM

(75) Inventors: Gevorg Nahapetian, Pleasanton, CA (US); Chih-hao Chen, Fremont, CA (US); Song Shang, Palo Alto, CA (US); Craig Schulz, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/096,494

(22) Filed: Mar. 29, 2005

(51) Int. Cl.
*G02F 1/01* (2006.01)
(52) U.S. Cl. ...................................... 359/238; 359/276
(58) Field of Classification Search ........ 359/237–239, 359/245, 276
See application file for complete search history.

(56) References Cited

U.S. PATENT DOCUMENTS 6,587,249 B1   7/2003   Henry 6,687,451 B1 *   2/2004   Sikora ........................ 398/187
2005/0012976 A1   1/2005   Harel et al.

OTHER PUBLICATIONS

Photonic Systems, Inc., "PSI 0202 Modulator Bias Controller," Rev. A, Product Information, (2001), pp. 1-4.
Sumitomo Osaka Cement Co., Ltd., "Application Note for LN Modulators," Optoelectronics Business Division, (Jul. 2002).
PHOTONICSystems, Inc., "Application Note Modulator Bias Controllers," pp. 1-14, (2004).

* cited by examiner

*Primary Examiner*—Timothy Thompson
*Assistant Examiner*—William Choi
(74) *Attorney, Agent, or Firm*—Blakely, Sokoloff, Taylor & Zafman LLP

(57) ABSTRACT

An apparatus comprising a control system coupled to an optical modulator. The control system including an Radio Frequency (RF)/dither ratio unit coupled to the optical modulator, wherein the RF/dither ratio unit to modify an amplitude of a dither signal inputted into the optical modulator to maintain a constant ratio between the amplitude of the dither signal and an amplitude of an RF input signal inputted into the optical modulator.

20 Claims, 9 Drawing Sheets

ADJUST GAIN SETTING OF
PROGRAMMABLE GAIN AMPLIFIER
700

UPDATE BIAS VOLTAGE INPUT
BASED ON RECOVERED
DITHER
800

OPTICAL MODULATOR CONTROL SYSTEM

BACKGROUND

1. Field

Embodiments of the invention relate to the field of optical modulators and more specifically, but not exclusively, to an optical modulator control system.

2. Background Information

Optical networks are used in telecommunication and enterprise networks to move data and communications. Optical signals provide high-speed, superior signal quality, and minimal interference from outside electromagnetic energy. Optical networks utilizing Dense Wavelength Division Multiplexed (DWDM) systems offer tunable multi-channel optical links.

Optical networks often include optical modulators, such as a Mach-Zehnder Modulator (MZM). The performance of optical modulators may be affected by numerous factors, such as a change in the environmental temperature. Many of today's optical modulators lack control systems to maximize modulator performance.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
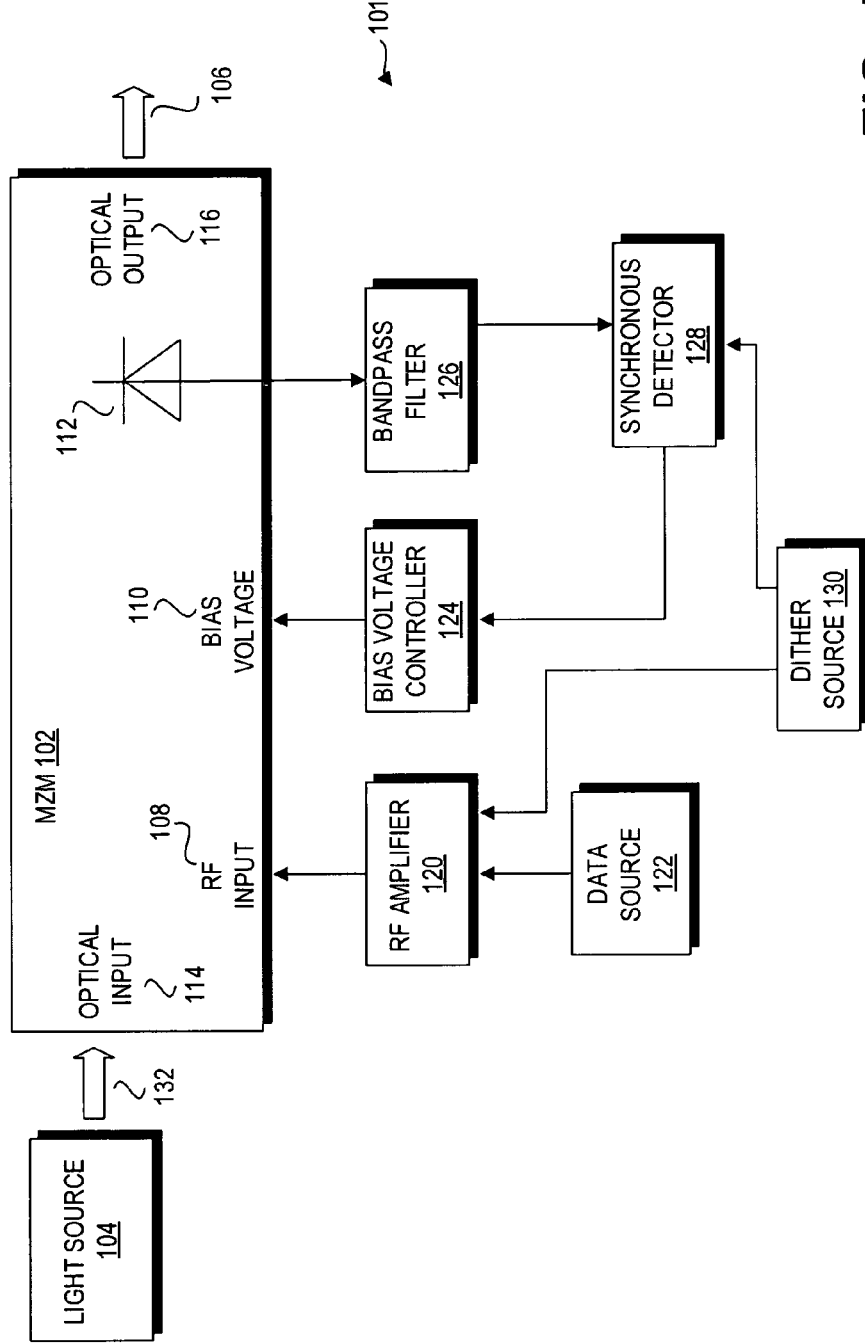
FIG. 1 is a block diagram illustrating an optical modulator control system in accordance with one embodiment of the present invention.

Turning to FIG. 1, an embodiment of an MZM 102 is shown. In short, MZM 102 may superimpose a Radio Frequency (RF) electrical data signal on a light carrier signal and produce an optical output signal to carry the data. While embodiments of the present invention are discussed herein in relation to an MZM, it will be understood that embodiments of the invention are not limited to MZM optical modulators.

MZM 102 includes an optical input 114 and an optical output 116. Optical input may be optically coupled to receive an optical input signal 132 from a light source 104. Light source 104 may include a semiconductor laser, an external cavity laser, or the like.

Figure 2:
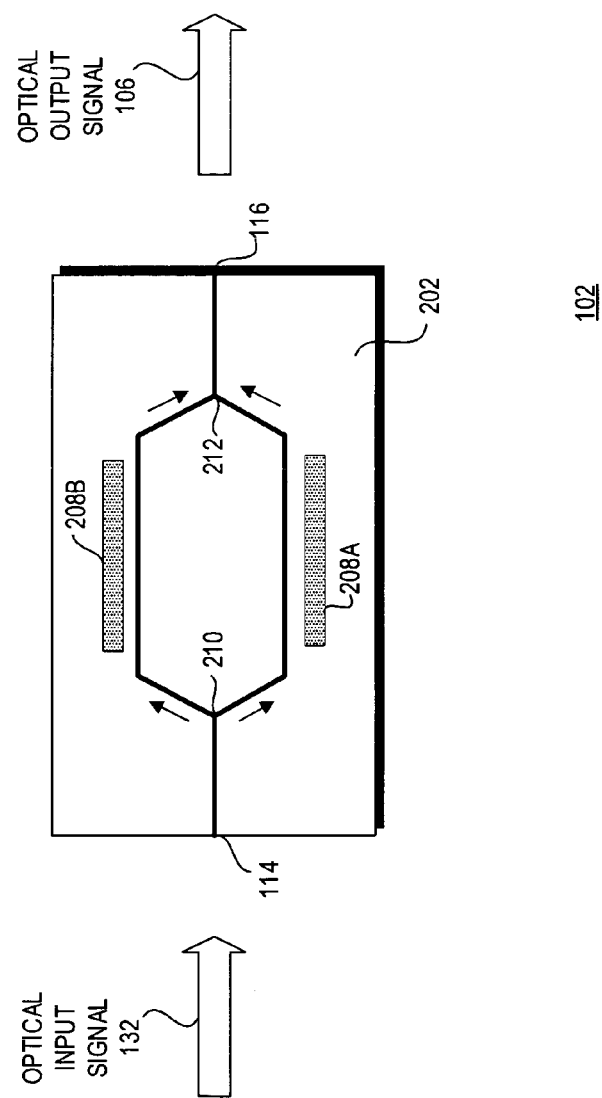
FIG. 2 is a block diagram illustrating an optical modulator in accordance with one embodiment of the present invention.

Turning to FIG. 2, an embodiment of MZM 102 is shown. MZM 102 may include Lithium Niobate (LN) 202. Optical input signal 132 enters MZM 102 at optical input 114. Optical input signal 132 is equally split by Y-junction 210 into two waveguides. The optical signal is recombined at Y-junction 212 and output as output optical signal 106 at optical output 116.

Electrodes 208A and 208B are used to affect the modulation of the optical signal. A voltage applied to LN 202 induces a change in the index of refraction of the LN 202. In one state, such as when a voltage is not applied to electrodes 208A, 208B, the optical signals re-combined at Y-junction 212 are in-phase and interfere constructively. In this case, optical output signal 106 is "high" and may be recognized as a logical "1."

In a second state, such as when a voltage is applied to electrodes 208A, 208B, the index of refraction of LN 202 changes, causing a phase shift between the two arms of MZM 102. When the optical signals recombine at Y-junction 212, destructive interference occurs leading to a "low" optical output signal 106 that may be interpreted as a logical "0."

Returning to FIG. 1, MZM 102 includes a Radio Frequency (RF) input 108 that receives an RF input signal. In one embodiment, the RF input signal may be applied to electrodes 208A, 208B to induce the modulation of the optical input signal 132. The RF input signal includes the data signal to be modulated onto the optical input signal 132. Data is provided to an RF amplifier 120 from a data source 122. RF amplifier 120 inputs the RF input signal to the RF input 108.

MZM 102 is coupled to a control system 101. Control system 101 includes mechanisms to optimize performance of MZM 102. As discussed further below, control system 101 includes a Direct Current (DC) bias voltage controller 124, a photo-detector 112, a bandpass filter 126, and a synchronous detector 128. Together, these components provide a bias voltage control loop for MZM 102.

Figure 3:
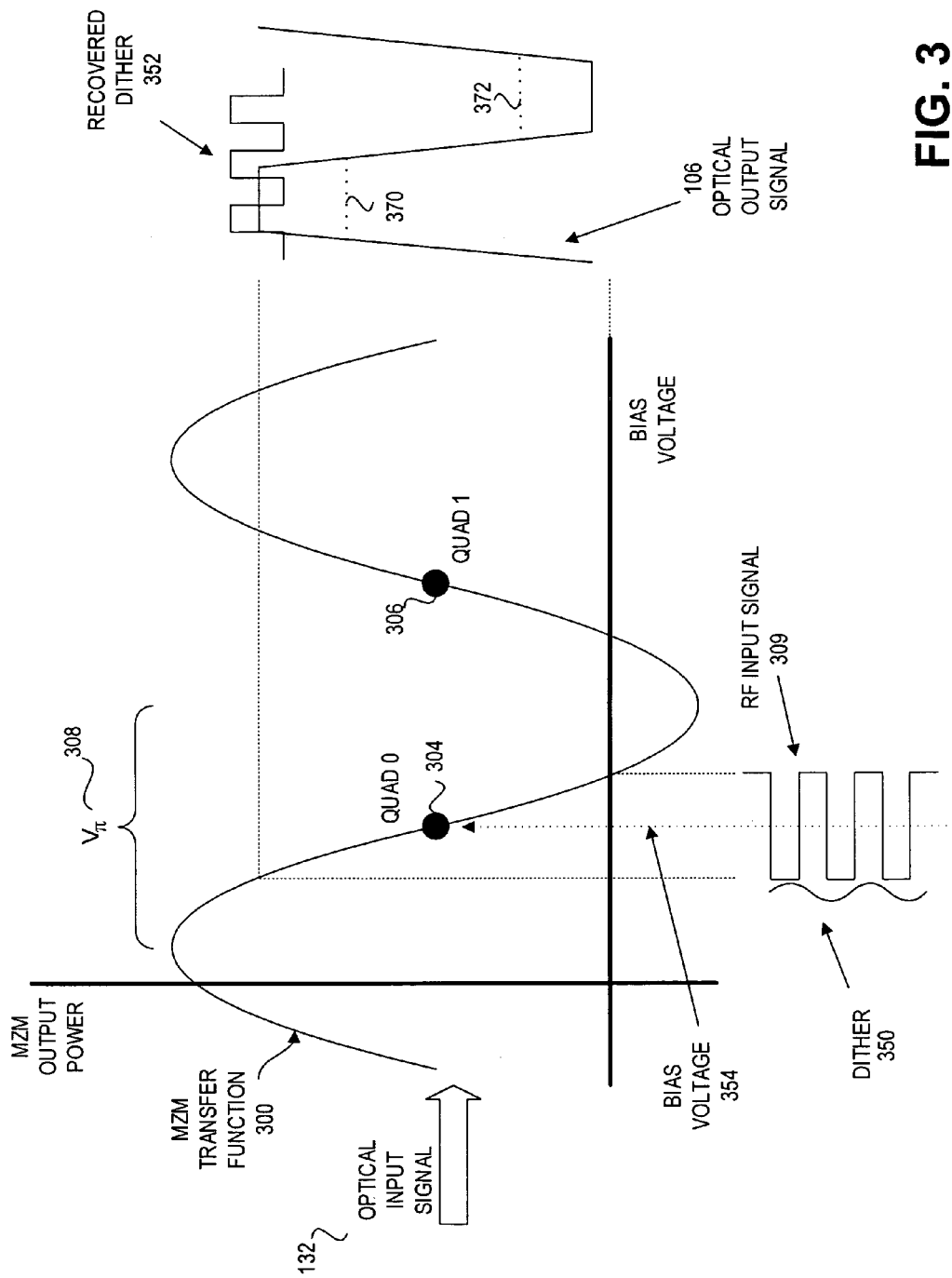
FIG. 3 is a diagram illustrating an optical modulator transfer function in accordance with one embodiment of the present invention.

Referring to FIG. 3, an MZM transfer function 300 is shown. The vertical axis shows the MZM output power and the horizontal axis shows the bias voltage. FIG. 3 shows Vπ 308 that is the bias voltage difference between a peak and a null of MZM transfer function 300. Vπ 308 may also be referred to as the driving voltage of MZM 102 that is the voltage difference that induces the "1" and "0" of the optical output. In one embodiment, Vπ 308 may be between 500 millivolts and 8 volts.

For best optical performance, RF input signal 309 should be applied at the quadrature point, Quad 0, shown at 304, or Quad 1, shown at 306. The position of the MZM transfer function where the RF input signal 309 is applied may be controlled by bias voltage 354.

However, MZM transfer function 300 may shift to the left or right due to environmental temperature changes or aging of MZM 102. This may result in poor optical output quality because the RF input signal 309 is no longer being applied at a quadrature point. The highs of the optical output signal 106 may have a lower amplitude, as shown at 370, and the lows may show an amplitude, as shown at 372. Bias voltage 354 is used to compensate for the drift of transfer function 300.

In one embodiment, an amplitude modulated (AM) dither is used to control bias voltage 354. In the AM dither technique, the amplitude of the RF input signal 309 is dithered by a low frequency signal, referred to as dither 350.

As shown in FIG. 1, a dither source 130 provides an input into RF amplifier 120 for generating dither 350. The amplitude of dither 350 is much smaller than the amplitude of RF input signal 309 so that dither 350 will not adversely affect the optical output signal 106. In one embodiment, dither 350 has a frequency of approximately 2 kilohertz (KHz).

Dither 350 is recovered by a photo-detector 112, shown as recovered dither 352. Photo-detector 112 pulls off a small percentage of optical output signal 106 for use in the bias voltage control loop. In one embodiment, the photo-detector 112 taps off 2–5% of optical output signal 106. Recovered dither 352 is passed through one or more bandpass filters 126 and inputted into a synchronous detector 128.

Synchronous detector 128 is also coupled to dither source 130. Recovered dither 352 received from bandpass filter 126 is multiplied by dither 350 from dither source 130 to produce an error signal for the bias voltage. In one embodiment, the smaller the amplitude of recovered dither 352, the closer the MZM is to the quadrature point.

Synchronous detector 128 sends the error signal to bias voltage controller 124 that controls the bias voltage applied to bias voltage input 110. Bias voltage controller 124 makes adjustments to the bias voltage input signal based on the error signal received from synchronous detector 128. In one embodiment, bias voltage 124 includes a Proportional-Integrator-Differential (PID) controller.

Figure 4:
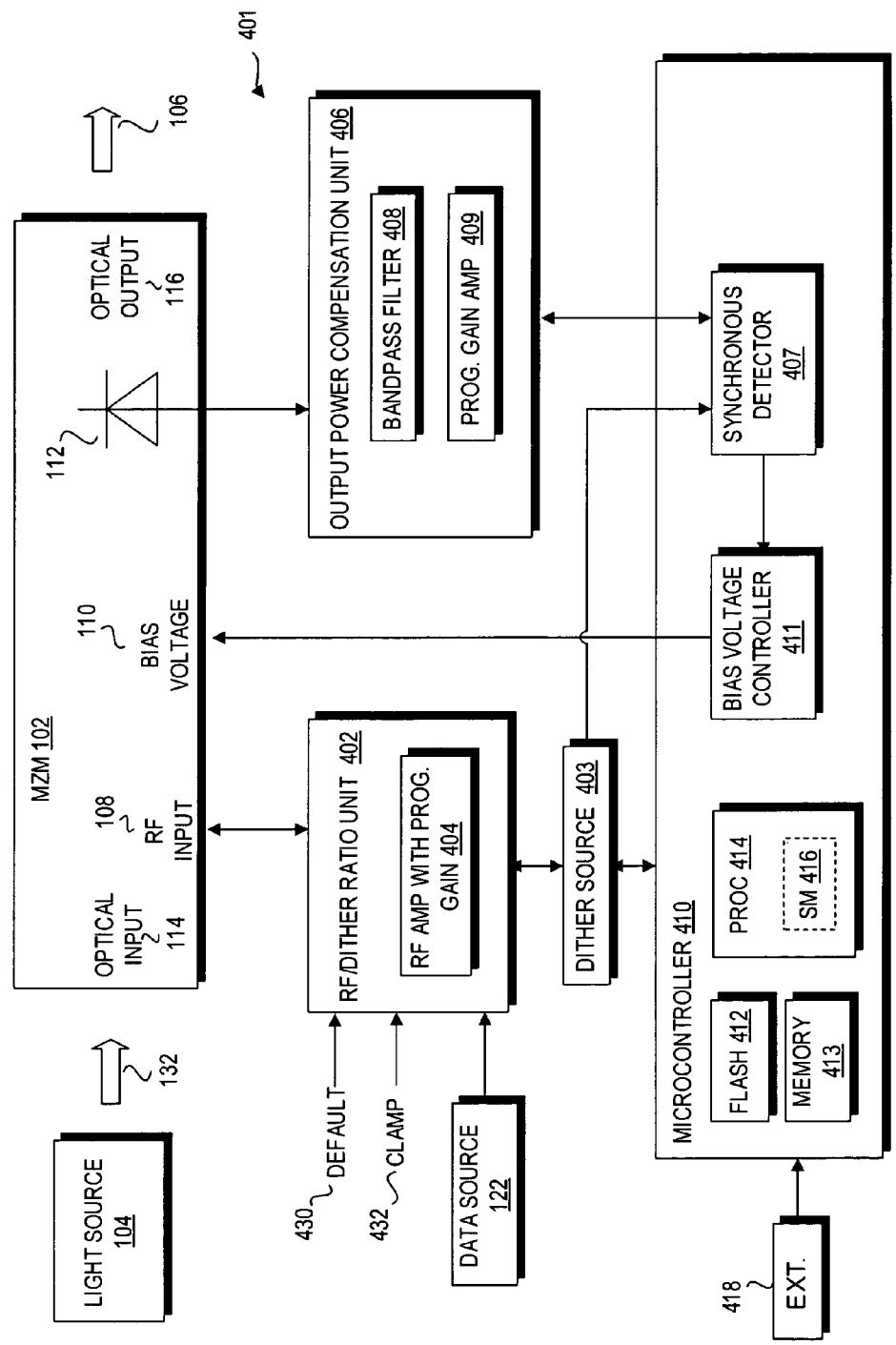
FIG. 4 is a block diagram illustrating an optical modulator control system in accordance with one embodiment of the present invention.

Turning to FIG. 4, an embodiment of a control system 401 coupled to MZM 102 is shown. Control system 401 includes an RF/dither ratio unit 402, an output power compensation unit 406, and a state machine 416. Embodiments of these control mechanisms will be discussed in turn below. It will be understood that embodiments of control system 401 do not necessarily include all the control features discussed below, but may include any combination thereof.

RF/dither ratio unit 402 may be used to control the amplitude of dither 350 to maintain a constant ratio between the amplitude of the RF input signal and the amplitude of the dither. For good operation, the amplitude of the dither should be very small compared to the amplitude of the RF input signal, otherwise the dither may affect the quality of the optical output signal. Hence, dither amplitude should be a function of the RF input amplitude and RF Vπ 308 for optimal MZM performance.

RF/dither ratio unit 402 provides an RF input signal to RF input 108. RF/dither unit 402 is also coupled to a dither source 403. RF/dither ratio unit 402 is also coupled to data source 122.

RF/dither ratio unit 402 includes an RF amplifier with programmable gain 404. RF/dither ratio unit 402 measures the amplitude of the RF input signal and uses RF amplifier 404 to adjust the amplitude of the dither signal to maintain a desired ratio. In one embodiment, the desired ratio of the amplitude of the RF input signal to the amplitude of the dither is approximately 100:1.

Output power compensation unit 406 may compensate for changes in the power of the optical output signal. Response time of the bias voltage control loop is related to the optical output power. As discussed above, the recovered dither is obtained from tapping a small portion of the optical output signal. The recovered dither amplitude is proportional to the power of the optical output signal. If the amplitude of the optical output signal decreases, then the amplitude of the recovered dither will also decrease proportionally. In one example, the power of the optical output signal may change due to changes in the output power of light source 104.

The response time of the bias voltage control loop will be inconsistent if the amplitude of the recovered dither is inconsistent. For example, in a first case, the optical output power is 1 milliwatt and the recovered dither has an amplitude of 1 volt. In a second case, the optical output power is 0.5 milliwatts and the recovered dither has an amplitude of 0.5 volts. The time to correct the bias voltage in the second case will take longer as compared to the first case because the bias error in the second case is perceived to be half as much as the first case.

Output power compensation unit 406 includes a bandpass filter 408 coupled to a programmable gain amplifier 409. Programmable gain amplifier 409 is used to adjust the gain of the recovered dither to compensate for changes in the output power of the optical output signal. In one embodiment, output power compensation unit 406 determines the average optical output power. This average optical output power is used to determine a gain setting on the programmable gain amplifier 409 so that synchronous detector 407 receives a recovered dither with an amplitude based on the average optical output power. Thus, the output power compensation unit 406 is used to maintain the same bias control loop response time for all light power levels.

In the second case of the above example, if the average optical output power is 1 milliwatt, then the amplitude of the recovered dither is adjusted to be 1 volt. So if the bias voltage loop recovery time is 1 second for a 1 volt recovered dither, then the recovery time will remain approximately 1 second regardless of fluctuations of the optical output power.

In one embodiment, a microcontroller 410 is coupled to MZM 102. Microcontroller 410 includes a synchronous detector 407 coupled to output power compensation unit 406. Synchronous detector 407 is also coupled to dither source 403 and to bias voltage controller 411 for control of the bias voltage control loop for MZM 102.

In one embodiment, microcontroller 410 includes a processor 414, memory 413, and flash memory 412 coupled by a bus (not shown). Flash memory 412 may store machine-readable instructions that may be loaded in memory 413 for execution by processor 414. In alternative embodiments, other types of non-volatile memory, such as Read-Only Memory (ROM), may be used to store machine-readable instructions.

A state machine 416 may be implemented by the execution of machine-readable instructions by processor 414. In other embodiments, state machine 416 may be implemented using an Application Specific Integrated Circuit (ASIC), a Field Programmable Gate Array (FPGA), or the like.

State machine 416 may be used to provide various control mechanisms for MZM 102. In one embodiment, if state machine 416 detects that the RF input signal or the optical input signal are below a corresponding threshold, then state machine 416 holds the bias voltage control loop in its present state. In this way, when the RF input signal or optical input signal are restored, the system recovers quickly.

The bias control loop only works properly when an RF input and a light input are present. If either signal is not present, then the bias voltage control loop will not lock to the quadrature point. The system will start to wander unpredictably because noise in the system may be perceived as bias control loop related signals.

Also, once the RF input signal or the optical input signal are restored, the time for system recovery may be excessive. The bias voltage may be at a severe setting because the bias voltage control loop was attempting to compensate for noise signals. Several iterations may be needed to bring the bias voltage back to a correct setting because the bias voltage had wandered so far off. Freezing the bias voltage at the present state by state machine 416 prevents such a long recovery time.

In another embodiment, state machine 416 may set the gain of RF amplifier 404 to a default setting 430 if data source 122 disappears. This switch to a default gain prevents saturation of RF amplifier 404 and enables quick recovery of the system when data source 122 is restored. Usually, during normal operation, the RF amplifier gain stays within 10% of default setting 430. The default gain setting will prevent the RF amplifier gain from straying to an outermost setting that will take excessive time to recover from. In one embodiment, default setting 430 is determined at the factory during calibration so default setting 430 is specific to each modulator unit.

In yet another embodiment, state machine 416 may use clamp 432 on RF amplifier 404 if the data source 122 is present, but has very low amplitude. When the data source's amplitude is very small, then the amplitude of the RF amplifier output also becomes very small even though the RF amplifier is saturated trying to achieve the desired RF input signal amplitude. This saturation degrades the optical output signal quality.

Clamp setting 432 prevents the RF amplifier from increasing the gain if the data source signal has small amplitude and the RF amplifier tries to keep compensating for this small amplitude. Clamp 432 will keep the gain limited to a particular level. In this way, when the amplitude of the data source signal is restored, the system may quickly recover. In one embodiment, clamp 432 is set at 25% above the default gain setting 430.

In one embodiment, microcontroller 410 may also include an external connection 418. External connection 418 may be compatible with an Inter-Integrated Circuit (I2C), a Serial Peripheral Interface (SPI), a Universal Serial Bus (USB), or the like. External connection 418 may include a port connector or a wireless connection. In one embodiment, a computer system, such as a notebook computer, may be coupled to microcontroller 410 using external connection 418 to make changes to the control system 401. In another embodiment, a computer system may be connected to external connection 418 to diagnose and test control system 401 and/or MZM 102.

In one embodiment, external connection 418 may be used to upgrade machine-readable instructions stored in flash memory 412 for state machine 416. In another embodiment, external connection 418 may be used to change control parameters, such as default setting 430 and/or clamp setting 432. Control settings used by state machine 416, such as the threshold levels of the RF input, the optical input signal, and the data source amplitude, may also be modified using external connection 418. In another embodiment, the desired RF/dither amplitude ratio may also be changed using external connection 418. Other programmable features include the nominal gain of unit 536 (discussed below) and the light detection level of photo-detector 112.

The programmability of microcontroller 410 provides for flexibility in control system 401. During manufacturing, control system 401 may be tailored for use by a particular customer. Also, once an optical modulator is deployed, control system 401 may be changed to adapt to environmental conditions or changes in customer requirements.

Figure 5:
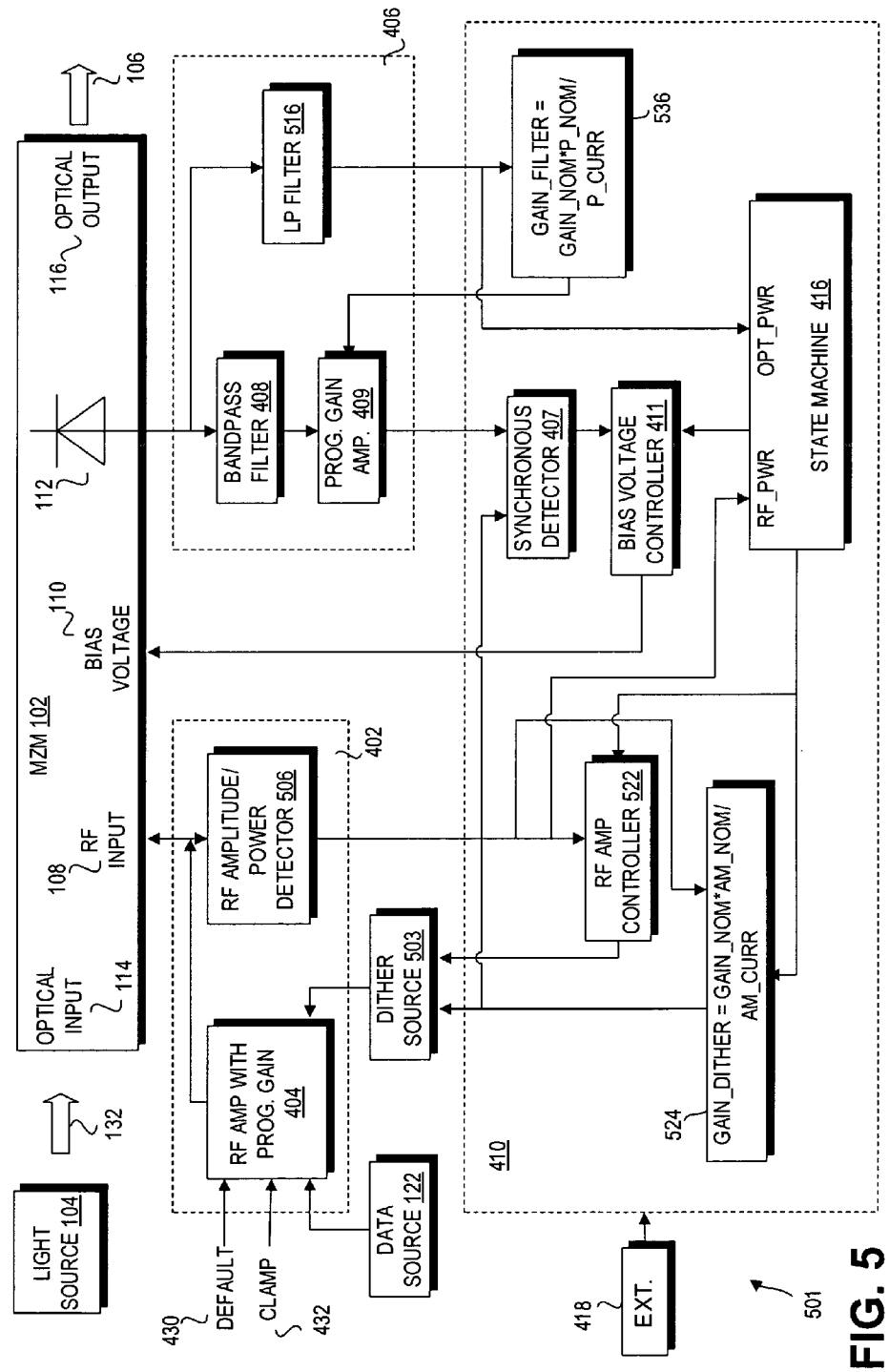
FIG. 5 is a block diagram illustrating an optical modulator control system in accordance with one embodiment of the present invention.

Turning to FIGS. 6–9, embodiments of the logic and operations of a control system is shown. FIGS. 6–9 will be discussed in connection with FIG. 5. FIG. 5 shows an embodiment of a control system 501. However, it will be understood that the logic and operations of FIGS. 6–9 are not limited to implementation on control system 501 of FIG. 5.

Figure 6:
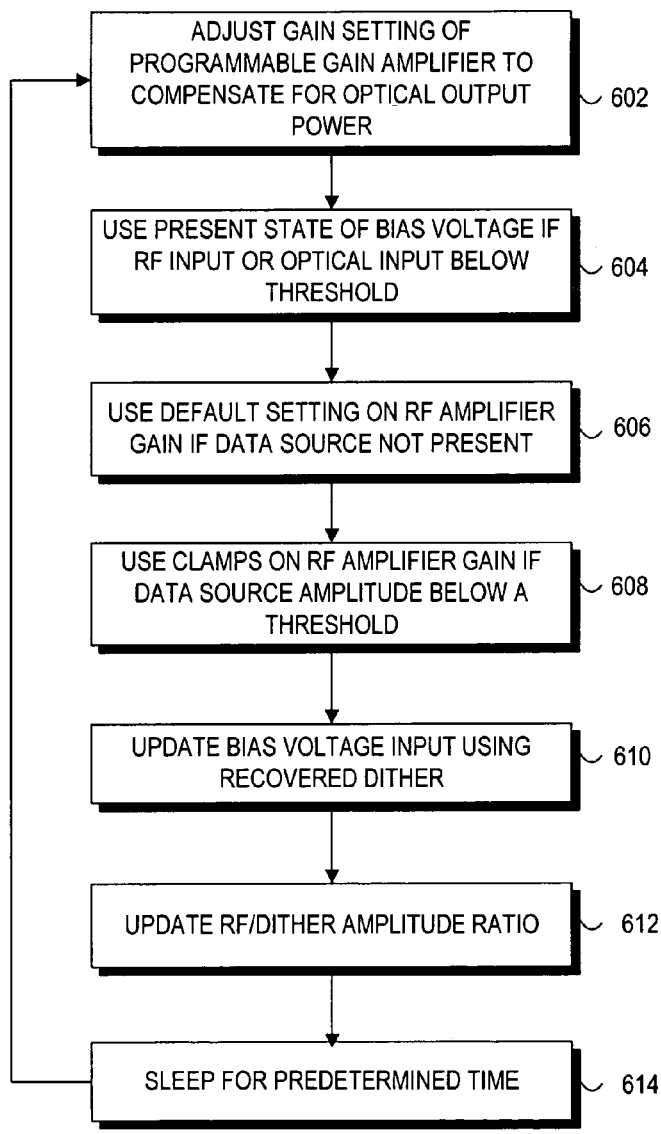
FIG. 6 is a flowchart illustrating the logic and operations of an optical modulator control system in accordance with one embodiment of the present invention.
Figure 7:
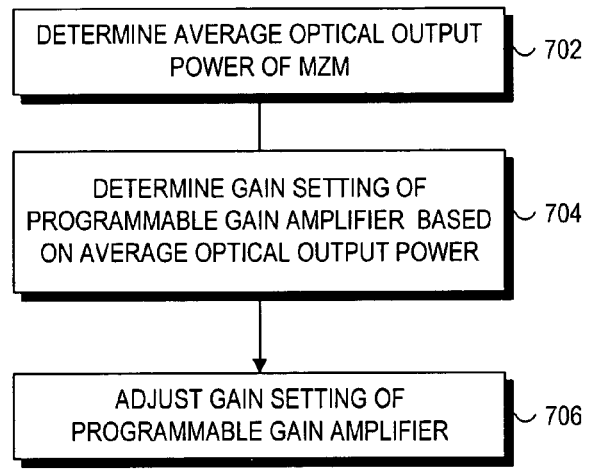
FIG. 7 is a flowchart illustrating the logic and operations of an optical modulator control system in accordance with one embodiment of the present invention.

Referring to FIG. 6, in a block 602, the gain of programmable gain amplifier 409 is adjusted to compensate for changes in output power of the optical output signal. Turning to FIG. 7, a flowchart 700 illustrating an embodiment of adjusting programmable gain amplifier 409 is shown. Starting in a block 702, the average optical output power of MZM 102 is determined. In one embodiment, a tap of the output power of the optical output signal 116 is received from photo-detector 112. The output from photo-detector 112 is sent to lowpass (LP) filter 516 to obtain the average optical output power.

Continuing to a block 704, the adjustment to the gain setting of the programmable gain amplifier 409 is determined. In FIG. 5, the average optical output power from LP filter 516 is inputted into a unit 536 of microcontroller 410. In unit 536, the gain setting for programmable gain amplifier 409 is determined. In one embodiment, the gain setting is computed by multiplying the nominal gain by the nominal output power divided by the current output power. The gain setting determined by unit 536 is sent to programmable gain amplifier 409.

Continuing to a block 706, the gain setting of programmable gain amplifier 409 is adjusted. Programmable gain amplifier 409 receives the recovered dither from bandpass filter 408. Programmable gain amplifier 409 applies the determined gain setting to adjust the recovered dither signal to the average optical output power. This adjusted recovered dither signal is then sent from programmable gain amplifier 409 to synchronous detector 407. As discussed above, this will result in a bias voltage error being computed relative to the average output power, and thus, produce a consistent recovery time for the bias voltage control loop.

Returning again to FIG. 6, in a block 604, the present state of the bias voltage is used if the RF input signal or the optical input signal is below a threshold. In FIG. 5, state machine 416 receives an average optical output power reading from LP filter 516. State machine 416 also receives an RF input power reading from RF amplitude/power detector 506 (discussed below). If the optical output power or the RF input power is below a pre-determined threshold, then the state machine instructs bias voltage controller 411 to continue to send the present bias voltage setting to bias voltage input 110.

Proceeding to a block 606, the default setting for gain on the RF amplifier is used if the data source is not present. In FIG. 5, state machine 416 instructs RF amplifier 404 to use the default gain setting 430 if a data signal from data source 122 is not present.

Continuing to a block 608, the clamp setting on RF amplifier 404 is used if the amplitude of the data source signal is below a threshold. In FIG. 5, state machine 416 instructs RF amplifier 404 to use clamp setting 432 on the gain of the RF input signal.

Figure 8:
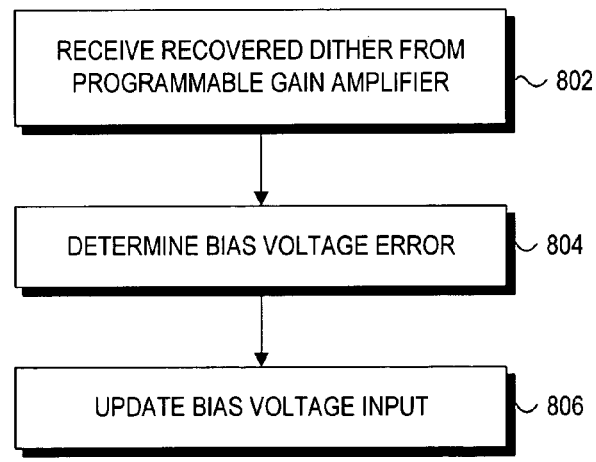
FIG. 8 is a flowchart illustrating the logic and operations of an optical modulator control system in accordance with one embodiment of the present invention.

Proceeding to a block 610, the bias voltage inputted to MZM 102 is updated using the recovered dither. Turning to FIG. 8, a flowchart 800 illustrates one embodiment of updating the bias voltage input. Starting in a block 802, the recovered dither is received from programmable gain amplifier 409 at synchronous detector 407. As discussed above, the amplitude of the recovered dither has been adjusted based on the average optical output power of MZM 102. Synchronous detector 407 uses the recovered dither and the inputted dither to determine a bias voltage error, as shown at a block 804. Continuing to a block 806, the bias voltage inputted to MZM 102 by bias controller 411 is updated.

Figure 9:
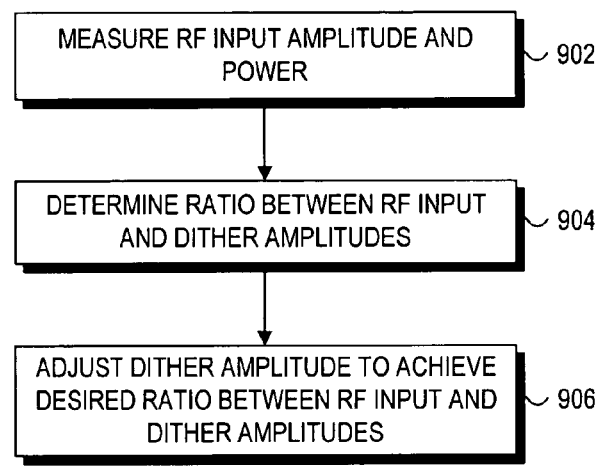
FIG. 9 is a flowchart illustrating the logic and operations of an optical modulator control system in accordance with one embodiment of the present invention.

Continuing to a block 612 of FIG. 6, the RF/dither amplitude ratio is updated by RF/dither ratio unit 402. Turning to FIG. 9, a flowchart 900 illustrates one embodiment of updating the RF/dither amplitude ratio. Starting in a block 902, the amplitude of the RF input signal is measured by RF amplitude/power detector 506. RF amplitude/power detector 506 is coupled to RF input 108 and RF amplifier controller 522.

Continuing to a block 904 a ratio between the dither amplitude and the RF input amplitude is determined. Continuing to a block 906, the dither amplitude is adjusted to achieve the desired ratio between the dither amplitude and the RF input amplitude. In one embodiment, dither source 503 produces the dither by altering the gain of the RF input signal by 1% at a 2 kHz frequency. A unit 524 of microcontroller 410 determines the gain of the dither and provides this to dither source 503 so that dither source 503 may make appropriate corrections.

In one embodiment, unit 524 computes the dither gain by multiplying the nominal dither gain by the nominal dither amplitude divided by the current dither amplitude. Dither gain is adjusted based on the RF input amplitude to maintain the desired ratio of (Dither Amplitude)/(RF input Amplitude). If amplitude of the RF input signal is increased, then the amplitude of the dither is increased proportionally. Similarly, if the amplitude of the dither is reduced, then the RF input amplitude is lowered accordingly.

Returning to FIG. 6, the logic proceeds from block 610 to a block 614 where the control system sleeps for a predetermined time, and then returns to block 602. In one embodiment, the control system sleeps for approximately 2 milliseconds.

Embodiments of the present invention provide a control system for an optical modulator, such as an MZM. In one embodiment, the control system adjusts to changing power levels of the light source to provide consistent transient performance. In another embodiment, the control system may adjust the dither amplitude to maintain a constant dither/RF input amplitude ratio for best optical signal quality. In yet another embodiment, the control system may detect conditions when the bias control loop cannot operate, such as when the light source or RF input has failed, and freezes the bias control loop in its present state. In another embodiment, by measuring the RF input signal power, the control system may prevent saturation of the RF amplifier by actively controlling the RF amplifier's gain. Embodiments of the invention also provide for modifying of the control system through an external connection.

Figure 10:
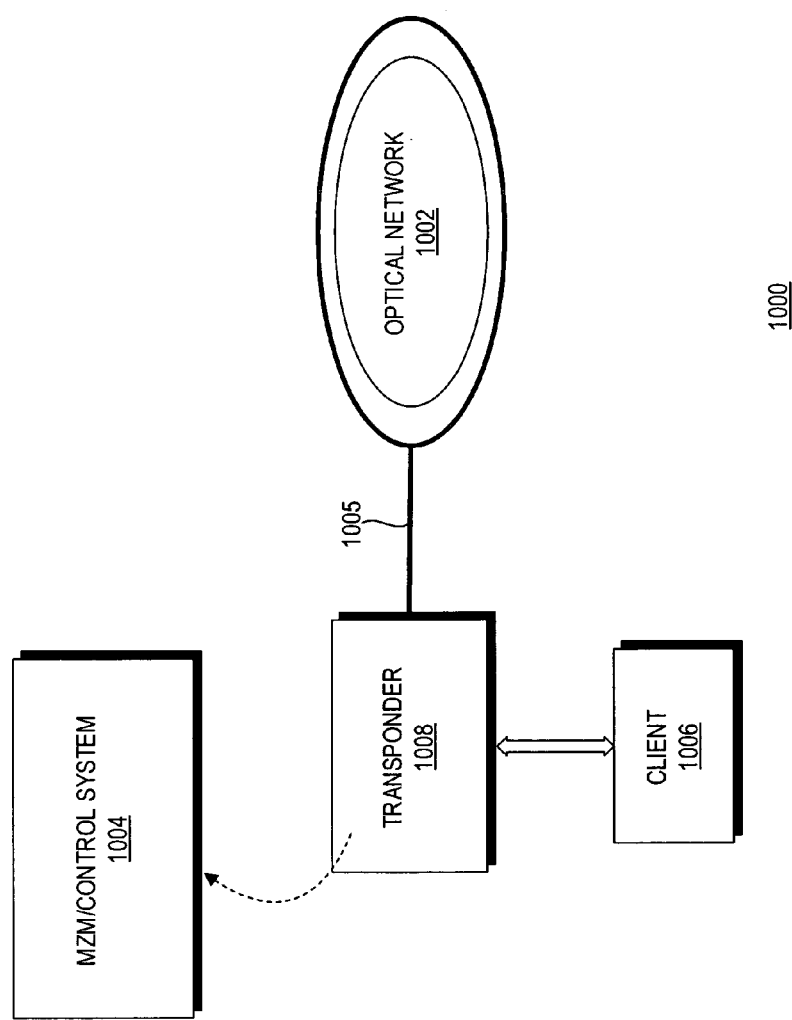
FIG. 10 is a block diagram illustrating a system including an optical modulator control system in accordance with one embodiment of the present invention.

Referring to FIG. 10, a system 1000 in accordance with one embodiment of the present invention is shown. System 1000 includes a transponder 1008 coupled to an optical network 1002 via optical link 1005. In one embodiment, optical link 1005 includes an optical fiber. Transponder 1008 is also coupled to client 1006. Embodiments of client 1006 include a router, a server, a host computer, a phone system, or the like. In one embodiment, system 1000 includes a Dense Wavelength Division Multiplexed (DWDM) system.

In general, transponder 1008 converts between optical signals of optical network 1002 and electrical signals used by client 1006. Transponder 1008 includes an MZM/control system combination 1004 as described herein.

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.). In addition, a machine-readable medium may include propagated signals such as electrical, optical, acoustical or other forms of propagated signals (e.g., carrier waves, infrared signals, digital signals, etc.).

The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. An apparatus, comprising:
an optical modulator; and
a control system coupled to the optical modulator, the control system including an Radio Frequency (RF)/dither ratio unit coupled to the optical modulator, wherein the RF/dither ratio unit is configured to modify an amplitude of a dither signal inputted into the optical modulator to maintain a constant ratio between the amplitude of the dither signal and an amplitude of an RF input signal inputted into the optical modulator.

2. The apparatus of claim 1 wherein the control system further comprises an output power compensation unit coupled to the optical modulator, wherein the output power compensation unit includes a programmable gain amplifier, wherein the programmable gain amplifier is configured to adjust the amplitude of the dither signal recovered from the optical modulator output in relation to an average output power of the optical modulator.

3. The apparatus of claim 1 wherein the control system further comprises a state machine coupled to the optical modulator and the RF/dither ratio unit, wherein the RF/dither ratio unit includes an RF amplifier having programmable gain to input signal into the optical modulator, and wherein the state machine is configured to set a default gain setting on the RF amplifier if a data source inputted into the optical modulator is not present.

4. The apparatus of claim 1 wherein the control system further comprises a state machine coupled to the optical modulator and the RF/dither ratio unit, wherein the RF/dither ratio unit includes an RF amplifier having programmable gain to input the RF input signal into the optical modulator, and wherein the state machine is configured to set a clamp gain setting on the RF amplifier if a data source inputted into the optical modulator is below a threshold.

5. The apparatus of claim 1 wherein the control system further comprises a state machine coupled to the optical modulator, wherein the state machine is configured to input a present state of a bias voltage into the optical modulator if a voltage of the RF input signal is below a threshold.

6. The apparatus of claim 1 wherein the control system further comprises a state machine coupled to the optical modulator, wherein the state machine is configured to input a present state of a bias voltage into the optical modulator if an optical input power level from a light source optically coupled to the optical modulator is below a threshold.

7. The apparatus of claim 1 wherein the optical modulator includes a Mach-Zehnder Modulator (MZM).

8. The apparatus of claim 1, further comprising an external connection coupled to the control system.

9. A method, comprising:
using a control system to maintain a desired ratio between a Radio Frequency (RF) input signal and a dither signal inputted into a Mach-Zehnder Modulator (MZM), wherein maintaining the desired ratio comprises:
measuring the amplitude of the RF input signal;
determining a ratio between the amplitude of the RF input signal and an amplitude of the dither signal; and
adjusting the amplitude of the dither signal to maintain the desired ratio.

10. The method of claim 9 wherein the desired ratio comprises a ratio between the amplitude of the RF input signal and the amplitude of the dither signal of approximately 100:1.

11. The method of claim 9, further comprising:
recovering the dither signal from the optical output signal of the MZM;
adjusting the amplitude of the recovered dither signal based on an average power of the optical output signal; and
controlling a bias voltage input into the MZM based on the adjusted recovered dither signal.

12. The method of claim 11 wherein adjusting the amplitude of the recovered dither signal comprises adjusting a gain setting of a programmable gain amplifier that receives the recovered dither signal and outputs the adjusted recovered dither signal.

13. The method claim 9, further comprising inputting a present state of a bias voltage into the MZM if a voltage of the RF signal is below a threshold.

14. The method of claim 9, further comprising inputting a present state of a bias voltage into the MZM if an optical input power level from a light source optically coupled to the MZM is below a threshold.

15. The method of claim 9, further comprising using a default gain setting on an RF amplifier having programmable gain that inputs the RF input signal if a data source inputted into the MZM is not present.

16. The method of claim 9, further comprising using a clamp gain setting on an RF amplifier having programmable gain that inputs the RF input signal if a data source inputted into the MZM is below a threshold.

17. The method of claim 9, further comprising modifying a control parameter of the control system using an external connection coupled to the control system.

18. A system, comprising:
an optical fiber; and
a transponder coupled to the optical fiber, the transponder including:
a Mach-Zehnder Modulator (MZM); and
a control system coupled to the MZM, the control system including
a Radio Frequency (RF)/dither ratio unit coupled to the MZM, wherein the RF/dither ratio unit is configured to modify an amplitude of a dither signal inputted into the MZM to maintain a constant ratio between the amplitude of the dither signal and an amplitude of an RF input signal inputted into the MZM.

19. The system of claim 18 wherein the control system further comprises an output power compensation unit coupled to the MZM, wherein the output power compensation unit includes a programmable gain amplifier, wherein the programmable gain amplifier is configured to adjust the amplitude of the dither signal recovered from the MZM output in relation to an average output power of the MZM.

20. The system of claim 18 wherein the control system further includes a state machine coupled the MZM, wherein the state machine is configured to freeze a bias voltage inputted into the MZM at a present state if a voltage of the RF input signal is below a threshold, and wherein the state machine is configured to freeze the bias voltage at the present state if an optical input power level from a light source optically coupled to the MZM is below a threshold.

* * * * *